(12) United States Patent
Heintschel et al.

(10) Patent No.: US 8,827,558 B2
(45) Date of Patent: Sep. 9, 2014

(54) BEARING BUSH ASSEMBLY FOR A TELESCOPIC STEERING SHAFT AND STEERING SYSTEM EQUIPPED THEREWITH

(71) Applicant: ZF Lenksysteme GmbH, Schwaebisch Gmuend (DE)

(72) Inventors: Manfred Heintschel, Schwaebisch Gmuend (DE); Ralf Urban, Geislingen (DE); Sebastian Kubisch, Stuttgart (DE); Achim Kraus, Lorh am Main (DE)

(73) Assignee: ZF Lenksysteme GmbH, Schwaebisch Gmuend (DE)

( * ) Notice: Subject to any disclaimer, the term of this patent is extended or adjusted under 35 U.S.C. 154(b) by 0 days.

(21) Appl. No.: 13/661,336

(22) Filed: Oct. 26, 2012

(65) Prior Publication Data

US 2013/0118291 A1   May 16, 2013

Related U.S. Application Data

(63) Continuation of application No. PCT/EP2011/051964, filed on Feb. 10, 2011.

(30) Foreign Application Priority Data

Apr. 28, 2010   (GB) .................. 10 2010 028 297

(51) Int. Cl.
*F16C 33/74* (2006.01)

(52) U.S. Cl.
USPC .......................................... 384/16

(58) Field of Classification Search
CPC ............ F16C 33/74; F16C 3/03; F16C 3/035; F16J 15/3236; F16J 15/3252; F16J 15/56
USPC ......... 384/130, 147, 148, 151, 153, 215, 220, 384/275, 276, 909; 74/492, 493; 280/775
See application file for complete search history.

(56) References Cited

U.S. PATENT DOCUMENTS

| 3,955,859 | A | * | 5/1976 | Stella et al. ................ 384/215 |
| 4,184,690 | A | * | 1/1980 | Brown ...................... 277/515 |
| 4,438,834 | A | | 3/1984 | Handke et al. |
| 4,445,598 | A | * | 5/1984 | Brambilla ............... 188/322.16 |

(Continued)

FOREIGN PATENT DOCUMENTS

| DE | 10 2006 012 057 | 9/2007 |
| EP | 0 297 166 | 1/1989 |
| EP | 0 519 533 | 12/1992 |

(Continued)

*Primary Examiner* — Phillip A Johnson
(74) *Attorney, Agent, or Firm* — Jordan and Hamburg LLP

(57) ABSTRACT

A bearing bushing assembly for a telescopic steering shaft comprises an outer tube and an inner tube, wherein the bearing bushing assembly comprises a bearing bushing, which is seated against the inner tube and made of an inflexible plastic material, and a sealing element, which is molded onto the bearing bushing and made of an elastic plastic material so as to connect the inner tube to the outer tube in an axially movable and sealing manner, the bearing bushing being enclosed by an elastic bushing, which in turn is enclosed by an end section of the outer tube, the outer circumference of the elastic bushing comprising outwardly extending rib-shaped elements, the elastic bushing comprises at least one sealing lip extending in the axial direction.

13 Claims, 3 Drawing Sheets

(56) References Cited

U.S. PATENT DOCUMENTS

| | | | |
|---|---|---|---|
| 4,911,454 A | 3/1990 | Rapp et al. | |
| 5,178,243 A | 1/1993 | Hamada et al. | |
| 5,421,591 A | 6/1995 | Katzensteiner | |
| 5,669,718 A * | 9/1997 | Sakairi et al. | 384/220 |
| 5,722,300 A * | 3/1998 | Burkhard et al. | 74/493 |
| 7,401,789 B2 * | 7/2008 | Harer et al. | 277/585 |
| 7,988,362 B2 | 8/2011 | Dittmann | |
| 2009/0028479 A1 | 1/2009 | Dittmann | |
| 2010/0059937 A1 | 3/2010 | Castleman et al. | |

FOREIGN PATENT DOCUMENTS

| | | | |
|---|---|---|---|
| EP | 0 751 309 | 1/1997 | |
| GB | 2 053 411 | 2/1981 | |
| GB | 2 243 898 | 11/1991 | |
| JP | 2004278788 A * | 10/2004 | F16J 15/16 |
| JP | 2007302232 A * | 11/2007 | |
| WO | WO-91/13277 | 9/1991 | |

* cited by examiner

BEARING BUSH ASSEMBLY FOR A TELESCOPIC STEERING SHAFT AND STEERING SYSTEM EQUIPPED THEREWITH

BACKGROUND OF THE INVENTION

The invention relates to a bearing bushing assembly for a telescopic steering shaft, comprising an outer tube and an inner tube, according to the preamble of claim 1 and to a steering system equipped therewith for a motor vehicle according to the preamble of the additional independent claim. The invention further relates to a module composed of the steering shaft and bearing bushing assembly and to the use thereof for a steering system. The invention relates in particular to a bearing bushing assembly and to a steering system equipped therewith, in which the bearing bushing assembly comprises a bearing bushing, which is seated against the inner tube and made of an inflexible plastic material, and a sealing element, which is molded onto the bearing bushing and made of an elastic plastic material, for connecting the inner tube to the outer tube in an axially movable and sealing manner.

Telescopic multi-piece steering shafts or telescopic steering shafts generally are provided with a bearing bushing assembly, comprising a bearing bushing and a sealing element that is designed as a sealing ring or wiper seal and used to guide the inner tube in the outer tube while sealing the two tubes with respect to each other. DE 10 2006 012 057 A1 proposes a bearing bushing assembly that is provided for a telescopic steering shaft, which comprises an outer tube and an inner tube. The bearing bushing assembly described comprises a bearing bushing made of inflexible, hard plastic material, this being polyamide, and a sealing element molded thereon, which is made of a flexible plastic material, this being an elastomer or plastic rubber, whereby an axially movable and sealing connection is created between the inner tube and outer tube. The sealing element, which is designed as a sealing ring or wiper seal, comprises, in particular, a sealing lip, which is seated against the inner tube or inner steering shaft. While the provided sealing ring or wiper seal reportedly offers reliable sealing against moisture and dirt, the use of such a design in steering systems revealed that the conventional bearing bushing assemblies contribute to a significant extent to the transmission of acoustic and mechanical vibrations between the chassis and the driver's cab. However, these disturbances are to be prevented, or at least significantly reduced.

It is therefore the object of the present invention to further improve a bearing bushing assembly of the type mentioned above so that the drawbacks described above are advantageously overcome. In particular, the bearing bushing assembly should have a sealing effect and also a noise-reducing effect.

SUMMARY OF THE INVENTION

Thus, the invention relates to a bearing bushing assembly that comprises a bearing bushing, which is seated against the inner tube and made of an inflexible plastic material, and a sealing element, which is molded on the bearing bushing and made of an elastic plastic material, so as to connect the inner tube to the outer tube in an axially movable and sealing manner, wherein the bearing bushing is enclosed by an elastic bushing, and more particularly a rubber bushing, which in turn is enclosed by an end section of the outer tube.

The invention also relates to a module for a steering system comprising a telescopic steering shaft and such a bearing bushing assembly, in addition, it relates to a steering system equipped therewith.

Because the bearing bushing is enclosed by an elastic bushing, and more particularly by a rubber bushing, damping that acts notably in the radial direction is achieved between the bearing bushing and the exterior steering shaft tube (outer tube), whereby the noise development and/or transmission are considerably reduced. The elastic bushing or rubber bushing preferably has outwardly extending rib-shaped elements, and more particularly convex ribs on the outer circumference, that achieve particularly effective radial damping. It is also advantageous for the elastic bushing, and more particularly the rubber bushing, to comprise at least one sealing lip that extends in the axial direction and also achieves an increased damping effect in the axial direction. The bearing bushing assembly preferably has a three-piece design that comprises an inner bearing bushing made of hard plastic material, a sealing element (wiper seal) that is molded thereon and made of flexible plastic material, and an elastic bushing, notably a rubber bushing, that surrounds the bearing bushing. However, the design can also be implemented in a two-piece configuration in that the bearing bushing is enveloped by a one-piece elastic component that performs both the sealing function (wiper seal function) and the damping function (rubber bushing function). The bearing bushing is thus enveloped in its entirety by at least one elastic component, preferably, however, enveloped sectionally by two components (wiper seal, rubber bushing).

It is thus advantageous for the outer circumference of the rubber bushing to comprise not only radially extending convex ribs, but also radial contact surfaces. The convex ribs and the radial contact surfaces are preferably arranged alternately on the outer circumference of the rubber bushing.

It is also advantageous for the elastic bushing, and more particularly the rubber bushing, to comprise a sealing lip that extends in the axial direction. Moreover, the bearing bushing assembly can comprise a retaining cap that encloses the end section of the outer tube, which in turn encloses the elastic bushing, and more particularly the rubber bushing. To this end, it is advantageous for the outside diameters of the elastic bushing or rubber bushing and/or of the sealing element, which is designed in particular as a wiper seal, to be smaller than the inside diameter of the retaining cap, whereby a radial clearance remains.

The sealing element, which is designed in particular as a wiper seal, can also comprise at least one first seal, which is seated against the retaining cap in the axial direction; likewise it can also comprise at least one second seal, which is seated against the retaining cap in the radial direction. For this purpose, it is advantageous for at least one of the seals to comprise two or more sealing lips that are disposed in a V-shaped manner.

The bearing bushing can further comprise at least one protrusion that extends in the radial direction and is encapsulated by a section of the sealing element. A particularly secure positive fit is thus achieved between the bearing bushing and the wiper seal, the positive fit being considerably more stable, notably in the axial direction, than is the case with the conventional solutions.

The invention will be described in more detail hereafter based on exemplary embodiments and with the aid of the accompanying schematic drawings.

DESCRIPTION OF THE PREFERRED EMBODIMENTS

Figure 1:
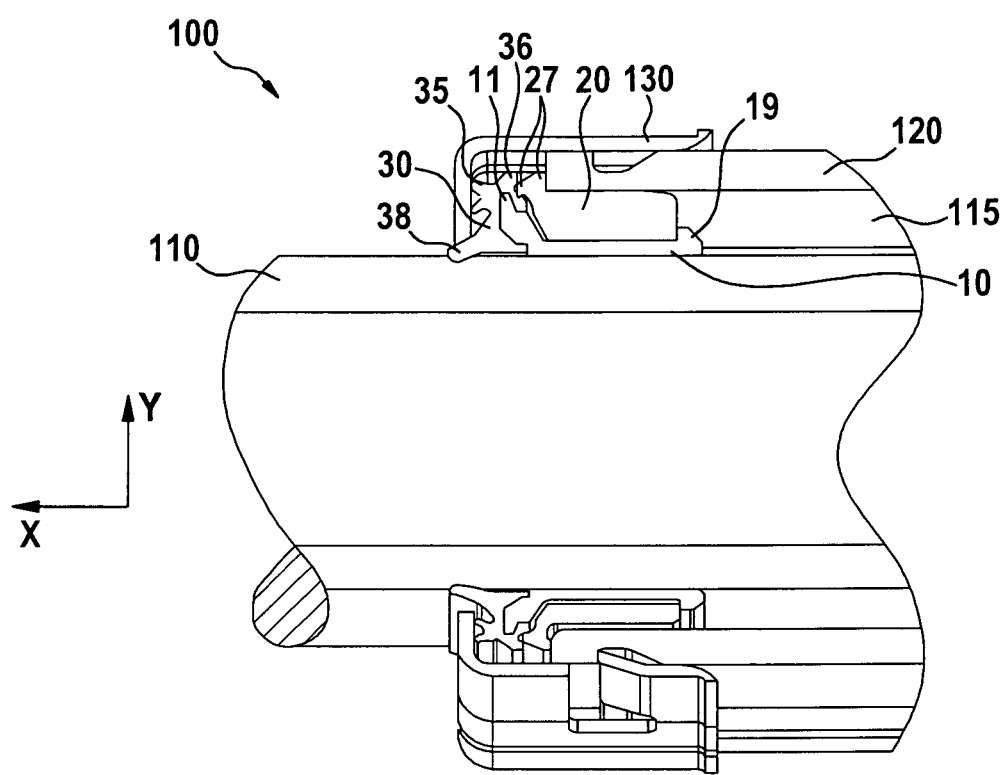
FIG. 1 is a sectional view of the design of a bearing bushing assembly according to the invention, with the assembly installed.

FIG. 1 shows the embodiment of a bearing bushing assembly 100 according to the invention with the assembly installed, which is to say when it is mounted on a telescopic steering shaft that comprises an inner tube 110 and an outer tube 120. The bearing bushing assembly 100 comprises an annular bearing bushing 10, which is seated against the inner tube 110 of the steering shaft, and is provided with a sealing element 30, which is molded onto the bearing bushing 10. The sealing element is designed as a sealing ring or wiper seal 30 and is sealingly seated against the inner tube 110. In addition, the bearing bushing assembly 100 comprises an elastic bushing in the form of a rubber bushing 20, which encloses the bearing bushing 10 on the outside and establishes contact on the outside with the outer tube 120 of the steering shaft. The rubber bushing 20 is thus disposed between the bearing bushing 10 and the outer tube 120 and causes a considerable reduction in the vibrations that develop or in the development and transmission of vibrations, and causes a decrease in the noise that may be caused thereby. It is also possible to dimension the clearance 115 between the inner tube 110 and the outer tube 120 so as to be larger. The bushing 20 is preferably made of rubber because analyses conducted by the applicant have shown that this material is particularly well-suited for achieving sufficient elasticity or damping without reducing the mechanical coupling between the outer tube 120 and the inner tube 110 of the steering shaft so strongly that the effect of the steering handle (steering wheel) for steering or the reaction from the wheels adversely affect the driver's steering sensation. Thus, two opposing objectives can be achieved: the development of vibrations and any potentially attendant noise development can be considerably reduced, and the "feedback from the road" required by the driver is completely preserved. Using rubber material additionally has the advantage that the damping properties and mechanical coupling properties can be adjusted very well to the respective steering system. This applies both with regard to the rubber mixture that is used, and with regard to the dimensioning of the bushing itself. Instead of rubber, it is generally possible to use any other spring-elastic material.

So as to achieve particularly good damping action both in the radial direction and in the axial direction, the elastic bushing or rubber bushing 20 comprises special design features in the form of radially oriented convex ribs 23 and/or contact surfaces (refer to FIG. 2) and axially oriented elastic elements in the form of sealing lips 27, which will be described in more detail hereafter.

The sealing element or the wiper seal 30 itself fulfills both the task of providing radial sealing with respect to the inner tube 110 and the task of providing axial sealing with respect to a retaining flap 130, which surrounds the entire bearing bushing assembly at least in the head region or end section and seals it, notably together with additional sealing lips 35 of the wiper seal 30. The wiper seal 30 also comprises axial contact surfaces 36 so as to provide sealing with respect to the rubber bushing 20. The axial sealing point of the wiper seal toward the retaining flap is designed by way of a seal or structure comprising two sealing lips 35 such that the same is also suitable for damping axial vibrations. For this purpose, the sealing lips 35 have a V shape in the radial section, which causes the sealing lips to be seated against the retaining flap 130 only in a very thin line and thus can easily provide cushioning due to the oblique positions thereof. However, the sealing lips also perform the actual sealing function so that the cavity between the two lips 35, which is required for the pulsation, is not filled with particles and/or liquids. If a large axial load (force in or counter to the X direction) acts on the wiper seal 30, the sealing lips 35 become flatly seated against the retaining flap 130, so that a large contact surface is available for the force transmission. In this case, the damping function takes on a lesser priority.

Figure 2:
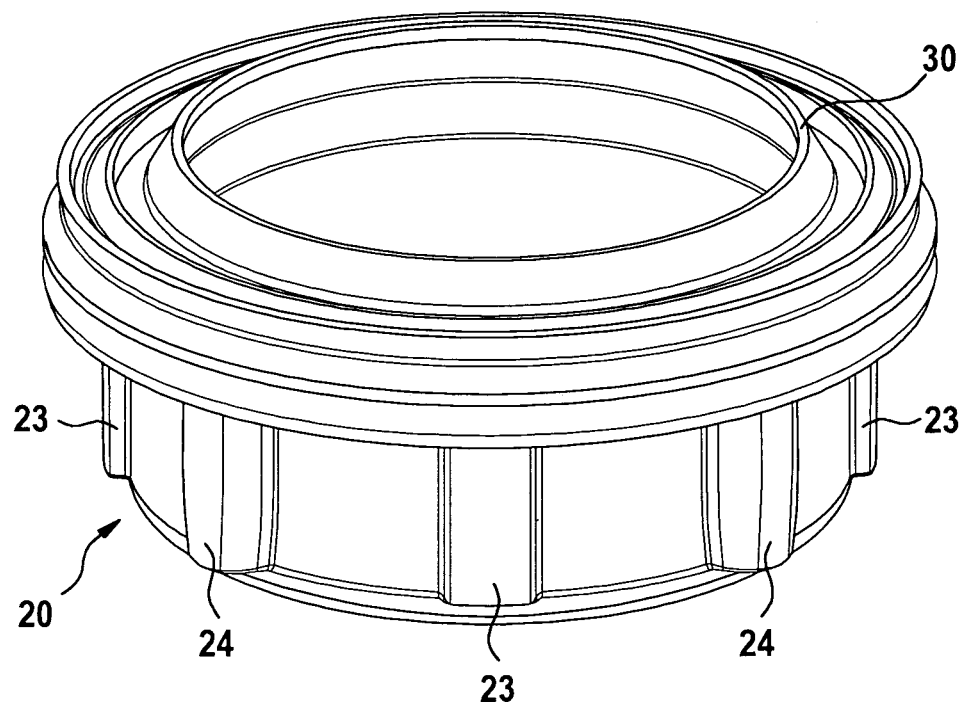
FIG. 2 shows a complete view of the bearing bushing assembly.

However, if low radial loads act on the steering shaft, such as those that occur during common driving operation, for example, the rubber bushing 20, which is pulled onto the bearing bushing 10, acts as a damping element for radially occurring vibrations (in or counter to the Y direction) between the bearing bushing 10 (guide bushing) and the outer tube 120 by way of a plurality of convexly shaped ribs 24 (refer also to FIG. 2). Because of the double-sided axial sealing lip structure 27, the rubber bushing 20 thus acts as an axial seal with respect to the outer tube 120 and with respect to the wiper seal 30.

So as to also be able to absorb the transverse forces on the steering shaft, which can be large at times, the convex ribs 24 are supplemented with radial contact surfaces 23 (refer to FIG. 2), which delimit the radial deflection at this bearing point in the event of overload. The bearing bushing additionally comprises a shoulder 19, by way of which the rubber bushing 20 is held axially.

It is of great importance that the sealing lips are optimally matched to each other by matching the material elasticities between the wiper seal 30 and rubber bushing 20 as well as the shape elasticity. This achieves an optimized compromise between reliable sealing and maximum axial vibration damping. By varying the material properties of the rubber bushing, it is also possible to influence the radial transverse rigidity, so that the radial damping properties can be influenced as well.

In particular, the convex ribs 24 of the radial guide of the rubber bushing 20 (refer also to FIG. 2) have the following effect: because of the convex shape, only a very small portion of the rubber material is seated against the outer tube during normally occurring operating forces. Because of the flexibility of the ribs 24 and as a result of the available space for yielding inside the guides in the outer tube, it is thus possible to dampen radial vibrations very well because the rubber material can be deformed with little radial force. This property also benefits the low displacement force. Thus, by way of the rubber bushing 20, it is possible to also reduce or prevent fluctuations of the displacement force for extending and retracting the telescopic shaft, such as those that can occur conventionally in tubes having straightness errors and rigid guidance.

Under larger radial loads, the ribs 24 flatten against the rubber bushing 20, whereby the same is seated against an increasingly large surface. The bearing unit thus becomes continually more rigid, whereby the potential transverse deflection is minimized.

It should be emphasized that the rubber bushing 20 and the wiper seal 30 have radial clearances for the desired damping action, so that the material can yield. For this purpose, the dimensions of the diameters of the rubber bushing 20 and wiper seal 30 are smaller than that of the retaining flap 130, which is to say the entire unit is floatingly mounted.

Figure 3A:
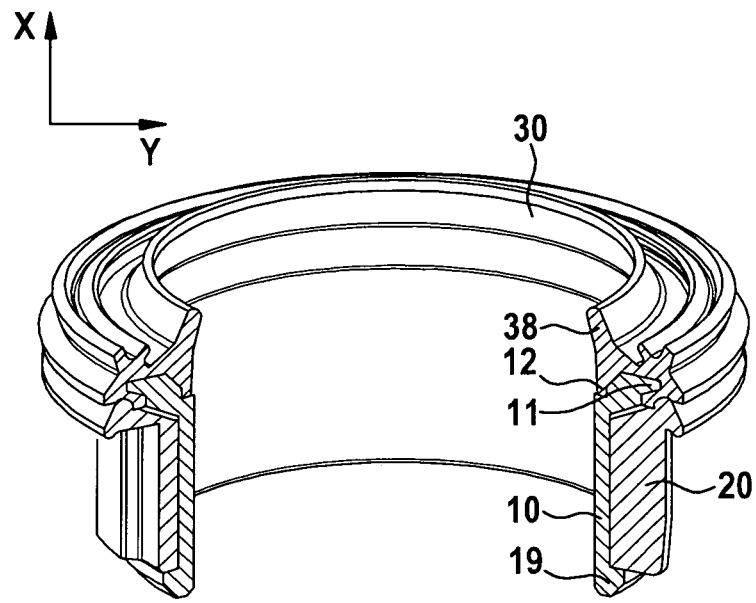
FIG. 3a shows a sectional view to illustrate the multi-piece design of the bearing bushing assembly in greater detail.
Figure 3B:
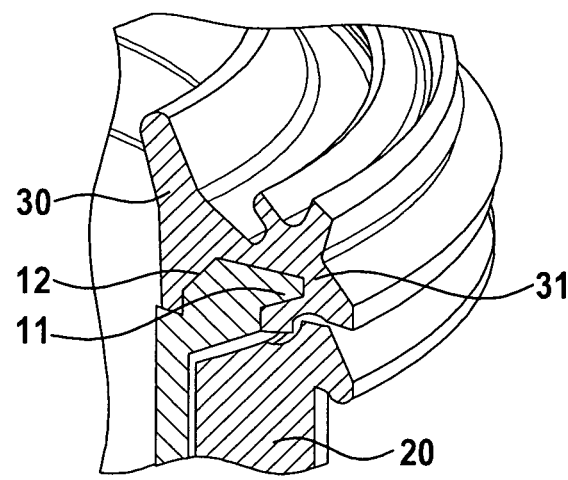
FIG. 3b is a detailed view which corresponds to the sectional view of FIG. 3b.

As is shown in more detail, particularly in FIGS. 3a and 3b, the connection between the bearing bushing 10 and the sealing ring or wiper seal 30 molded thereon has a special design so as to solve the following problem:

As is already known from the prior art, the bearing bushing 10 and the sealing element 30 can be designed as a one-piece component by molding the softer sealing element 30 onto the harder bearing bushing 10. The positive fit between these two plastic parts that is achieved should be as good and rigid as possible. For this purpose, the aforementioned DE 10 2006 012 057 A1 (refer to passage [0018] therein) proposes providing denticulated ribs on the face of the bearing bushing, whereby the molded-on sealing element becomes anchored with the denticulated ribs of the bearing bushing due to the shrinkage that occurs during cooling after the molding operation. However, this design has the drawback that a sufficiently rigid connection of the two plastic materials is only achieved if sufficient material shrinkage occurs during cooling after the molding operation. However, it would be desirable to also achieve a secure, positive, independent connection between the two plastic materials so that the bearing bushing and the sealing element (sealing ring, wiper seal) connected thereto behave in the manner of a one-piece element or component, wherein the bearing bushing has harder and the sealing ring has softer properties.

The design principle illustrated based on FIGS. 3a and 3b is proposed here as a separate (uniform), or even combined solution, in which one end of the bearing bushing 10 has a protrusion 11 extending in the radial direction Y, which in turn is encapsulated by a section 31 of the sealing element or wiper seal 30. This results in the wiper seal 30 enclosing the protrusion 11 of the bearing bushing 10 in the radial direction in a pronounced manner, whereby a secure connection, substantially independently of the shrinkage process during cooling, is established between the bearing bushing 10 and the wiper seal 30. The protrusion 11 extending in the radial direction is preferably designed as an annular rib that is provided on the one side of the bearing bushing 10. The sealing element or the wiper seal 30 surrounds this rib 11 during the molding operation, so that the wiper seal 30 and the bearing bushing 10 are rigidly seated on top of each other. This molding operation eliminates the need for subsequent assembly. In addition, a rigid connection so as to form a one-piece component is achieved. Compared to the denticulated ribs known from the prior art, this positive fit is not dependent on whether sufficiently extensive material shrinkage occurs during cooling after the molding operation.

The described invention achieves considerable damping of radially and/or axially occurring vibrations, and thus a considerable noise reduction in the steering system. In addition, the positive fit in the multi-piece bearing bushing assembly is improved.

LIST OF REFERENCE NUMERALS 100 bearing bushing assembly (for telescopic steering shaft)
110 inner tube of the steering shaft
120 outer tube of the steering shaft
115 clearance between outer tube and inner tube
130 retaining cap
10 bearing bushing
11 protrusion (annular rib)
12 positive connection (with wiper seal 30)
19 contact shoulder for axially securing the rubber bushing
20 elastic bushing, for example rubber bushing
23 radial contact surface(s) for overload
24 convex ribs for radial guidance
27 sealing lips for axial sealing
30 sealing element (wiper seal)
35 axial seal(s) against retaining flap 130
36 axial contact surface for seal
38 lip for radial sealing with respect to inner tube 110

The invention claimed is:

1. A bearing bushing assembly for a telescopic steering shaft comprising an outer tube and an inner tube, wherein the bearing bushing assembly comprises a bearing bushing, which is seated against the inner tube and made of an inflexible plastic material, and a sealing element, which is molded onto the bearing bushing and made of an elastic plastic material, so as to connect the inner tube to the outer tube in an axially movable and sealing manner, the bearing bushing being enclosed by a rubber bushing, which in turn is enclosed by an end section of the outer tube, the outer circumference of the rubber bushing comprising outwardly extending convex ribs, bushing at least one sealing lip extending in the axial direction.

2. The bearing bushing assembly according to claim 1, wherein the bearing bushing assembly comprises a retaining cap that encloses the end section of the outer tube, which in turn encloses the rubber bushing.

3. The bearing bushing assembly according to claim 2, wherein the sealing element comprises at least one first seal that is seated against the retaining cap in the axial direction; and wherein the sealing element is a wiper seal.

4. The bearing bushing assembly according to claim 3, wherein the sealing element comprises at least one second seal that is seated against the retaining cap in the radial direction; and wherein the sealing element is a wiper seal.

5. The bearing bushing assembly according to claim 3, wherein at least one of the seals comprises two or more sealing lips that are arranged in a V shape.

6. The bearing bushing assembly according to claim 1, wherein the outside diameters of the rubber bushing, and/or of the sealing element are smaller than the inside diameter of a retaining flap, whereby a radial clearance remains; and wherein the sealing element is a wiper seal.

7. The bearing bushing assembly according to claim 1, wherein the outer circumference of the rubber bushing comprises radial contact surfaces.

8. The bearing bushing assembly according to claim 7, wherein the convex ribs and the radial contact surfaces are alternately disposed on the outer circumference of the rubber bushing.

9. The bearing bushing assembly according to claim 1, wherein the bearing bushing comprises at least one protrusion that extends in the radial direction and that is encapsulated by a section of the sealing element.

10. The bearing bushing assembly according to claim 9, wherein the protrusion is designed as an annular rib and/or the sealing element is designed as a wiper seal comprising a sealing lip that is seated against the inner tube.

11. A module for a steering system comprising a steering shaft that has a telescopic design and comprises an outer tube and an inner tube, and further comprising a bearing bushing assembly according to claim 1.

12. A steering system having a module comprising a steering shaft that has a telescopic design and comprises an outer tube and an inner tube, and further comprising the bearing bushing assembly according to claim 1.

13. Use of a bearing bushing assembly for a telescopic steering shaft comprising an outer tube and an inner tube, wherein the bearing bushing assembly comprises a bearing bushing, which is seated against the inner tube and made of an inflexible plastic material, and a sealing element, which is molded onto the bearing bushing and made of an elastic plastic material, so as to connect the inner tube to the outer tube in an axially movable and sealing manner, wherein the bearing bushing is enclosed by a rubber bushing, which in turn is enclosed by an end section of the outer tube.

\* \* \* \* \*